United States Patent [19]

Hurst et al.

[11] Patent Number: 4,777,453

[45] Date of Patent: Oct. 11, 1988

[54] QUADRATURE AMPLITUDE MODULATOR USING SWITCHED CAPACITOR FILTER

[75] Inventors: Paul Hurst, Yolo; Kiyoshi Fukahori, Grass Valley, both of Calif.

[73] Assignee: Silicon Systems Inc., Tustin, Calif.

[21] Appl. No.: 44,883

[22] Filed: May 1, 1987

[51] Int. Cl.$^4$ ............................................. H04L 27/04
[52] U.S. Cl. ................................... 332/16 T; 332/17; 332/21
[58] Field of Search ................ 332/21, 16 T, 17, 9 R, 332/9 T, 16 R, 22; 375/39; 370/12

[56] References Cited

U.S. PATENT DOCUMENTS

| | | | |
|---|---|---|---|
| 4,458,216 | 7/1984 | Bingham | 332/9 R |
| 4,626,803 | 12/1986 | Holm | 332/21 X |
| 4,661,948 | 4/1987 | Shapiro et al. | 332/21 X |
| 4,680,556 | 7/1987 | Nakamura et al. | 332/16 R |

Primary Examiner—Siegfried H. Grimm
Attorney, Agent, or Firm—Blakely, Sokoloff Taylor & Zafman

[57] ABSTRACT

A switched capacitor circuit implements a base band, finite impulse response filter (BBF) and balanced modulator with a single operational amplifier. The analog modulator has particular application in voice band modem applications and requires little or no microprocessor code space. Simplified sine and cosine functions are implemented in a pair of base band filters such that the output of only one base band filter is required at any one time. In this manner, a single operational amplifier may be utilized to implement the analog modulator/base band filter of the present invention. The use of switched capacitor technology and a single operational amplifier results in less silicon area dedicated to the analog modulator than for corresponding digital modulators.

10 Claims, 2 Drawing Sheets

QUADRATURE AMPLITUDE MODULATOR USING SWITCHED CAPACITOR FILTER

BACKGROUND OF THE INVENTION

1. Field of the Invention

This invention relates to the field of modulators for use in signal transmission systems.

2. Background Art

In electronic signal processing and data transmission, it is often desired to transmit data signals from a transmitting station to a receiving station. In practice, the data signal is modulated for transmission and demodulated on reception. Examples include radio wave transmissions, (including AM and FM) and telephone line transmission. The raw data which is to be transmitted, whether in analog or digital format, is known as a "base band signal". Typically, base band signals are not suitable for transmission in an efficient manner, if at all. In order to facilitate transmission of such information, base band signals must be shifted to high frequencies suitable for efficient transmission. This is done by varying the amplitude, phase or frequency (or combinations of these) of a high frequency carrier wave in accordance with the information to be transmitted. This is known as "modulation". In order to receive the information, it must be decoded by removing the carrier wave, this process being known as "demodulation".

Single units capable of both transmitting and receiving data corresponding include both a modulator and demodulator and are known as "modems". The use of modems has increased in recent years as computer use has increased. A modem allows data from one computer terminal to be transmitted through telephone lines and received by one or more computer terminals.

In the past, most modulators have been implemented in digital integrated circuit format. For example, digitized data is digitally modulated and fed to a multi-bit (8–10) ditital to analog (D/A) converter and the resulting signal is transmitted. Modems and associated modulators are typically controlled by a microprocessor under the command of a digital code. If the modulator is implemented in digital format, code space in the microcontroller must be dedicated to the modulator. In addition, in integrated circuit implementations, a digital to analog converter requires a large amount of silicon area, adding to the expense and size of the integrated circuit.

Further, in order to provide a high speed modem, it is desireable to define "symbols" representing multiple bits of data. One popular method of modulating data to provide such multi bit symbols is quadrature amplitude modulation (QAM). In quadrature amplitude modulation, a constellation of 16 points in defined which can be selected by four bits of information. Base band data is converted to two channels, known as an in-phase channel and a quadrature channel. Each channel represents two bits of information so that 16 points can be defined. Each channel must then be modulated and filtered prior to transmission. Thus, modems implementing a QAM scheme require two modulating channels, taking up additional silicon space.

In order to overcome these disadvantages, it is desired to provide a modulator implemented in complete analog format and which requires less silicon area to implement than digital modulators. It is further desired that a single analog modulator be used for modulation of two data channels.

Therefore, it is an object of the present invention to provide an analog modulator for modem applications.

It is another object of the present invention to provide an analog modulator which employs switched capacitor circuitry and requires less silicon area than a corresponding digital implementation.

It is yet another object of the present invention to provide an analog modulator which may be implemented with a single operational amplifier and be used with two data channels.

SUMMARY OF THE PRESENT INVENTION

A switched capacitor circuit implements a base band, finite impulse response filter (BBF) and balanced modulator with a single operational amplifier. The analog modulator has particular application in voice band modem applications and requires little or no microprocessor code space. Simplified sine and cosine functions are implemented such that the output of only one base band filter is required at any one time. In this manner, a single operational amplifier may be utilized to implement the modulation of two data channels. The use of switched capacitor technology and a single operational amplifier results in less silicon area dedicated to the analog modulator than for corresponding digital modulators.

BRIEF DESCRIPTION OF THE DRAWINGS

FIG. 5 is a block diagram illustrating the two data input channels of the present invention.

DETAILED DESCRIPTION OF THE PRESENT INVENTION

An analog modulator implemented in switched capacitor circuitry is described. In the following description, numerous specific details are set forth, such as number of capacitors, sine and cosine function, etc. to provide a more thorough description of the present invention. It will be obvious, however, to one skilled in the art, that the present invention may be practiced without these specific details. In other instances, well known features have not been described in detail in order not to unnecessarily obscure the present invention.

Figure 1:
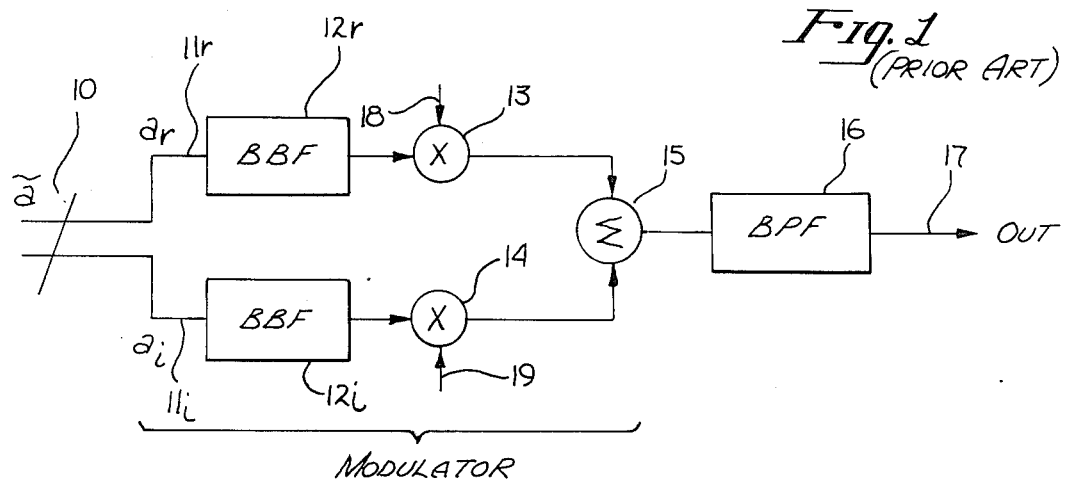
FIG. 1 is a circuit diagram illustrating a prior art modulator.

Referring to FIG. 1, a typical prior art modulator is illustrated. A data input 10, having a real (in-phase) component 11r and an imaginary (quadrature phase) component 11i, is inputted to base band filters (BBF) 12r and 12i respectively. The output 32 of base band filter 12 ir is inputted to multiplier 13 where it is multiplied by cos w(c)t 18 and outputted to summer 15.

The output 33 of base band filter 12i is inputted to multiplier 14 where it is multiplied by −sin w(c)t 19 and inputted to summer 15. The output of summer 15 is coupled to band pass filter 16 whose output 17 is the modulated and filtered data signal. In practice, the circuit of FIG. 1 is used to provide quadrature amplitude modulation (QAM). As noted previously, such modulators are typically coded on a general purpose microprocessor or digital signal processor. This requires the dedication of code as well as silicon area.

The present invention implements an analog modulator which implements the sine and cosine multipliers as switching modulators. The input data itself and the modulation frequency control the switches of the switching modulator.

Figure 2:
FIG. 2 is a timing diagram illustrating the simplified cosine and sine functions utilized in the present invention.

FIG. 2 is a timing diagram illustrating the modulating signals utilized to replace the sine and cosine multipliers of prior art modulator circuits. The cos w(c)t 18 is replaced with modulating signal 20. Modulating signal 20 is a three level signal which is at zero at alternate clocks.

−sin w(c)t 19 is replaced with signal 21 of FIG. 2. Signal 21 is also a three level modulating signal which is zero on alternate clocks. Modulating signals 20 and 21 are non-overlapping such that one of the signals is zero at each clock. Therefore, only one output of the base band filters implementing the modulating signals is required at any one time. By multiplexing the data channel inputs, only a single base band filter/modulator is required, saving silicon area without sacrificing performance.

Figure 3:
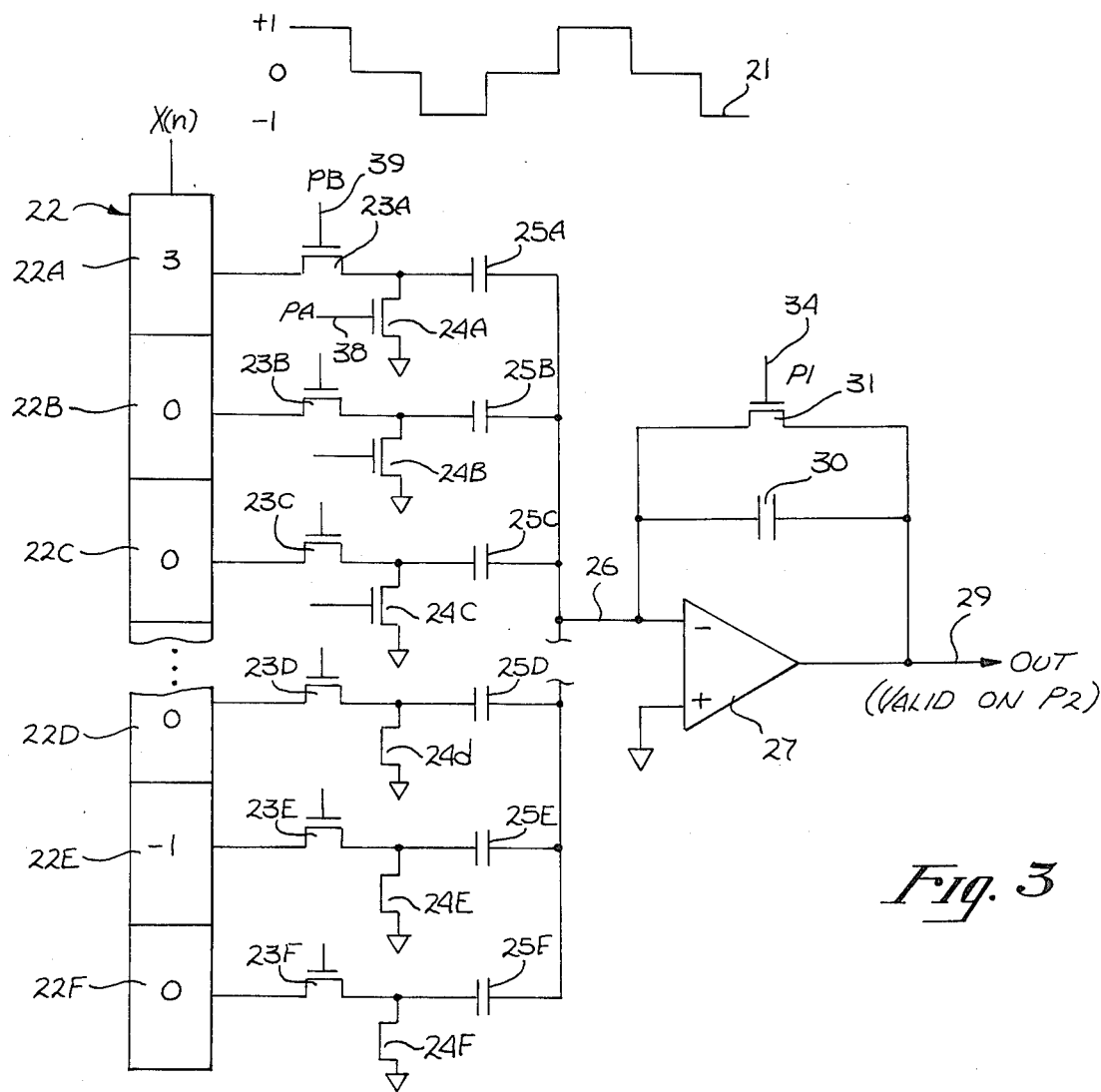
FIG. 3 is a circuit diagram illustrating the switched capacitor implementation of the analog modulator of the present invention.

The preferred embodiment of the present invention is illustrated in FIG. 3. Data channels 11r and 11are each inputted to delay lines comprising, in the preferred embodiment, analog shift registers. By way of example, in FIG. 3, only a single analog shift register 22 is illustrated. However, it is understood that a shift register is provided for each data channel with the outputs of the shift registers being multiplexed to a single base band filter/modulator of the type illustrated in FIG. 3. Although the multiplexing circuitry is not illustrated in FIG. 3, any suitable means for alternating the input of data channels 11r and 11to the circuitry of FIG. 3 may be utilized such as shown in FIG. 5.

Analog shift register 22 is comprised of a two bit/cell digital shift register followed by a 2 bit D/A converter. In the preferred embodiment the first three cells 22A-22C and the last three cells 22D-22F are shown as representative examples. The output of each cell is coupled to the sources of N channel transistors 23A-23F respectively.

The gates of transistors 23A-23F are coupled to phase B (PB) clocking signal 39. Transistors 23A-23F are drain coupled to transistors 24A-24F respectively. The sources of transistors 24A-24F are coupled to ground. The gates of transistors 24A-24F are coupled to phase A (PA) clocking signal 38. PA 38 and PB 39 are non-overlapping clock signals which in the preferred embodiment are generated by the circuitry of FIG. 4.

The drains of transistors 23A-23F and 24A-24F are coupled to one terminal of capacitors 25A-25F respectively. The other terminals of capacitors 25A-25F are coupled to node 26, the inverting input of operational amplifier 27. The non-inverting input of amplifier 27 is coupled to ground. The output of amplifier 27 at node 29 is coupled to node 26 through capacitor 30 and N channel transistor 31 in parallel. The gate of transistor 31 is coupled to phase one (P1) clock signal 34.

The base band filter of the preferred embodiment of the present invention is linear so the impulse response is symmetric. The 24 point impulse response of the preferred embodiment thus requires only 12 input capacitors, generating one-half of the symmetric impulse response.

The incoming data x(n) changes at a bit rate of 2400 bits per second. The modulator/base band filter samples at 9600 hertz in the preferred embodiment of the present invention.

4 bits of data grouped together at the 600 hertz band rate are split into two two bit signals 11r and 11respectively. Prior to inputting to the appropriate shift register, the data is passed through a differential encoder where the two signals 11r and 11take values of plus or minus 1 and plus or minus 3 to define a 16 point QAM signal constellation. As noted previously, the analog shift register 22 is comprised of 2 digital bits per cell followed by a 2 bit D/A converter.

Transistors 23a-23f and 24a-24f act as switches controlled by a sampling frequency of 9600 Hz in the preferred embodiment. Thus, capacitors 25a-25f are switched between ground and shift register 22. The switching of capacitors 25A-25F is controlled by clocking signals PA 38 and PB 39. These signals are generated by the circuitry of FIG. 4. A two bit counter 40 is coupled to a clocking signal 50 which is four times the carrier frequency (i.e. the frequency of sine and cosine approximations 20 and 21). Counter 40 outputs a least significant bit (LSB) 41 and a most significant bit (MSB) 42.

MSB 42 is coupled as an input to AND gates 44 and 47. The other input of AND gate 47 is a phase one (P1) signal 34. The other input of AND gate 44 is phase two (P2) signal 35. P1 34 and P2 35 are nonoverlapping clock signals at a frequency of 9600 Hz.

MSB 42 is inverted through inverter 43 and coupled to AND gates 45 and 46. The other input of AND gate 45 is P1 34 while the other input of AND gate 46 is P2 35.

The outputs of AND gates 44 and 45 are coupled to OR gate 48. The outputs of AND gates 46 and 47 are coupled to OR gate 49. The output of OR gate 48 is PA 38. The output of OR gate 49 is PB 39.

Figure 4:
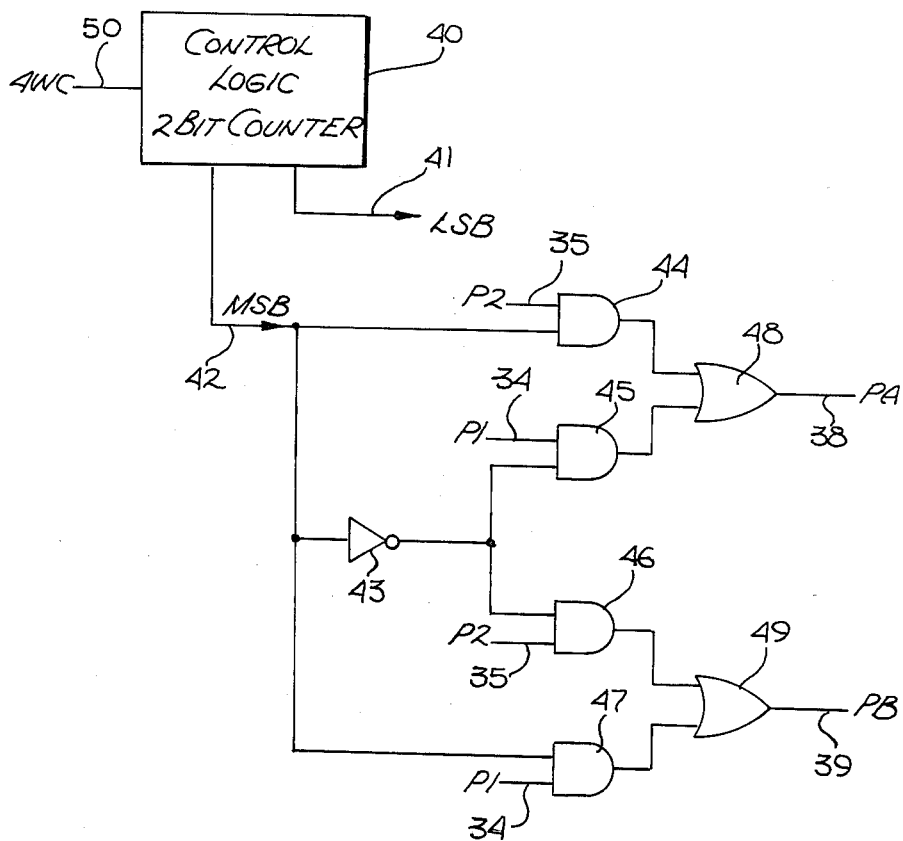
FIG. 4 is a circuit diagram illustrating the generation of switching signals for the circuit of FIG. 3.

The circuitry of FIG. 4 is such that PA 38 is equal to P1 34 (and PD 39= to P2 35) for two clock cycles followed by two clock cycles in which PA is equal to P2 (and PB is equal to P1). However, as previously discussed, the data channels 11r and 11are coupled to the modulator/base band filter circuitry of FIG. 3 on alternate clock cycles. In this manner, the +1, −1 multiplication required by the three level sine and cosine approximations 20 and 21 may be accomplished in the base band filter. Since the base band filter is linear, the multiplication of the input by a positive or negative one is the same as multiplying the output by positive or negative 1. A positive 1 multiplication is accomplished when PB 39 is equal to P1 34 and PA 38 is equal to P2 35. A negative one multiplication is accomplished when PB 39 is equal to P2 35 and correspondingly PA 38 is equal to P1 34.

As previously discussed, the real and imaginary parts of the data x(n) take values of plus or minus 1 and plus or minus 3. These input levels may be generated by a voltage divider or any other suitable means. Example of data inputs of different values is shown at cells 22a and 22e of shift register 22.

A number of the cells are shown containing a 0 value. However, in the preferred embodiment of the present invention, a zero is not stored in the register. Rather, the input capacitors 25a-25f are coupled only to non zero cell values at any one time. Due to the 9600 Hz sampling rate, there are only two non zero values in the shift register 22 at a time.

The circuit of FIG. 3 acts as a finite impulse response base band filter and modulator. Because of the unique implementation of three level waveforms in place of sine and cosine carrier waves, a single combined modulator/base band filter can be used for both the real and imaginary data channels.

The output of the base band filter of the present invention is given by the equation:

$$Out(n) = -\sum_{M=1}^{24} [(Cm)/CFB] [x(n-m)]$$

where
Cm=the capacitance of selected capacitors 25A-25F and
CFB=Capacitance of capacitor 30
X(n)=input data (11r or 11i of FIG. 1)

Thus, an analog modulator utilizing a single summing amplifier and implemented in switched capacitor technology has been described.

We claim:

1. A circuit for shaping and modulating at least first and second data signals comprising:
   first and second storage means for storing said first and second data signals respectively;
   filter means selectively coupled to said first and second storage means for shaping said first and second data signals and multiplying said first and second data signals by first and second carrier signals respectively, said first and second carrier signals coupled to said filter means;
   said first and second carrier signals being non-overlapping step functions such that only one of said first and second carrier signals is non zero at any one time;
   whereby the output of said filter means comprises a sum of said first and second data signals.

2. The circuit of claim 1 wherein said first data signal comprises an in phase portion of a QAM signal and said second data signal represents a quadrature portion of said QAM signal.

3. The circuit of claim 2 wherein said first and second storage means each comprise an analog shift register.

4. The circuit of claim 3 wherein said filter means comprises switching means coupled to said shift register and a plurality of input capacitors, said switching means for selectively coupling said capacitors to said shift register, said filter means further including an operational amplifier coupled to said capacitors.

5. The circuit of claim 4 wherein said switching means comprises a first plurality of transistors and a second plurality of transistors, each of said first plurality of transistors coupled to one of said input capacitors and to said shift register, each of said second plurality of transistors coupled to one of said input capacitors and to ground,
   said first transistors being gate coupled to a first clock signal and said second transistors being gate coupled to a second clock signal, said first and second clock signals being nonoverlapping.

6. The circuit of claim 5 wherein said first and second clock signals are outputted by a control circuit coupled to third and fourth clock signals such that said first clock signal is equal to said third clock signal and said second clock signal is equal to said fourth clock signal, and said first clock signal is equal to said fourth clock signal and said second clock signal is equal to said third clock signal for alternate consecutive cycles of said third and fourth clock signals respectively.

7. A circuit for shaping and modulating first and second data signals comprising:
   input means for receiving said first and second data signals;
   first switching means coupled to said first and second data signals and to a plurality of capacitors, said first switching means for selectively coupling said first and second data signals to said capacitors;
   summing means coupled to said capacitors;
   said first switching means, capacitors and summing means for multiplying said first and second data signals by first and second carrier signals coupled to said first switching means, said first and second carrier signals being nonoverlapping step functions such that only one of said first and second carrier signals in non zero at any one time, said summing means outputting a first output signal representing a shaped and modulated sum of said first and second data signals.

8. The circuit of claim 7 wherein said first switching means comprises first and second metal oxide semiconductor (MOS) transistors having first and second gates coupled to first and second non-overlapping clock signals defining a sampling rate of said circuit.

9. The circuit of claim 8 further including first and second storage means coupled to said first and second data signals, each of said first and second storage means comprising an analog shift register.

10. The circuit of claim 9 wherein said first and second clock signals are generated by a control circuit coupled to third and fourth clock signals such that said first clock signal is equal to said third clock signal and said second clock signal is equal to said fourth clock signal, and said first clock signal is equal to said fourth clock signal and said second clock signal is equal to said third clock signal on alternate consecutive clock cycles of said third and fourth clock signals respectively.

* * * * *